United States Patent Office 3,014,913
Patented Dec. 26, 1961

3,014,913
ORTHO-ALKANOYLOXY-BENZOATES OF
N-PHENYLETHYL-4-PIPERIDINOL
Roman P. Holysz, Kalamazoo, Mich., assignor to The Upjohn Company, Kalamazoo, Mich., a corporation of Delaware
No Drawing. Filed Nov. 16, 1959, Ser. No. 852,970
7 Claims. (Cl. 260—294.3)

This invention pertains to novel chemical compounds, and is particularly directed to novel alkanoyl-salicylate esters of 1-phenethyl-4-piperidinols, in the form of their free bases, acid adidtion salts, and lower-alkyl quaternary ammonium salts.

The compounds of the invention in their free base form are represented by the following general structural formula:

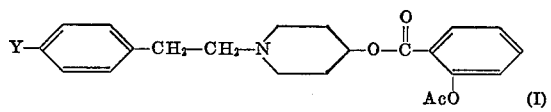

wherein Y is selected from the group consisting of hydrogen; halogen having an atomic weight between 35 and 127, i.e., chlorine, bromine, and iodine; lower-alkyl, for example, methyl, ethyl, butyl, amyl, hexyl, and isomeric forms thereof; and lower-alkoxy, for example, methoxy, ethoxy, butoxy, pentoxy, hexyloxy, and isomeric forms thereof; and wherein Ac is a alkanoyl radical, for example, acetyl, propionyl, butyryl, valeryl, hexanoyl, heptanoyl, octanoyl, and isomeric form thereof. The nitrogen atom can be coordinated with hydrogen or an alkyl radical; for example, the lower-alkyl radicals given above, to form cations of acid addition salts and lower-alkyl quaternary ammonium salts.

The novel lower-alkyl quaternary ammonium salts of the invention possess valuable pharmacological activities. Illustratively, the quaternary ammonium compounds are anticholinergics, and can be administered to mammals for stimulating respiration and increasing blood pressure. The free bases and acid addition salts of the invention are useful intermediates in the preparation of the quaternary ammonium salts of the invention. Moreover, the free base compounds of the invention are useful, in accordance with U.S. Patents 1,915,334 and 2,075,359, in forming amine fluosilicate mothproofing agents, and in accordance with U.S. Patents 2,425,320 and 2,606,155, in forming amine thiocyanate-formaldehyde condensation products for use as pickling inhibitors.

The alkanoylsalicylate esters of 1-phenethyl-4-piperidinols, i.e., 1-phenethyl-4-piperidyl alkanoyl-salicylates having Formula I above, are readily obtained by esterifying a 1-phenethyl-4-piperidinol having the following general structural formula:

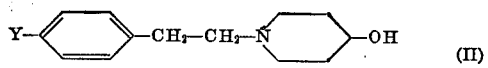

wherein Y is as defined above, with a alkanoyl-salicylic acid esterifying agent. A alkanoylsalicylic acid esterifying agent is, for example, alkanoyl-salicylic anhydride, alkanoylsalicyloyl halide, and like reagents. Illustratively, the esterification can be accomplished with a alkanoylsalicyloyl halide, for example, acetylsalicyloyl chloride, to produce a 1-phenethyl-4-piperidyl acetylsalicylate.

The acetylsalicyloyl chloride can be prepared by reacting acetylsalicylic acid with thionyl chloride according to the method described in Beilstein, 4th ed., vol. 10, 1st suppl., p. 43. By substituting thionyl bromide for thionyl chloride, acetylsalicyloyl bromide is obtained. Other alkanoylsalicylic acids can be reacted with thionyl chloride or thionyl bromide in the same manner to give alkanoylsalicyloyl chlorides or bromides for reaction with a 1-phenethyl-4-piperidinol having Formula II. Alkanoyl-salicylic acids, many of which are known, can themselves be prepared according to known procedures, illustratively, by acylating salicylic acid with a alkanoic anhydride, or with a alkanoyl halide in the presence of pyridine; see Beilstein, 4th ed., vol. 10, 2d suppl., pp. 42–43.

Advantageously, the piperidinol compound and alkanoylsalicyloyl halide are reacted in the presence of an inert solvent, illustratively, ether, tetrahydrofuran, dioxane, toluene, xylene, benzene, methylene chloride, and the like, and an acid acceptor, illustratively pyridine, lutidine, picoline, triethylamine, and the like. If desired, the acid acceptor can also serve as the inert solvent merely by employing a sufficient quantity of the same, without including an additional inert solvent of the kind illustrated. The reactants can be employed in stoichiometric proportions, i.e., equimolar proportions, or an excess of either reactant can be employed if so desired. Ordinarily, however, it is preferred to employ the alkanoylsalicyloyl halide in an amount which is at least equimolar with respect to the piperidinol compound, particularly when an acid acceptor is added to the reaction mixture. The reaction proceeds satisfactorily at temperatures ranging from about −25° C. to about 100° C., preferably from about −5° C. to about 25° C. After the reaction has been completed, the resulting 1-phenethyl-4-piperidyl alkanoylsalicylate (Formula I, above) can be isolated in free base form in conventional manner, for example, by neutralizing the reaction mixture, illustratively, with an aqueous solution of sodium bicarbonate or sodium hydroxide, extracting the neutralized mixture with a solvent, illustratively, methylene chloride, benzene, ether, and the like, separating the layers, and evaporating the organic layer.

The acid addition salts of the free bases (Formula I above) are obtained by neutralizing the free bases with acids, illustratively, hydrochloric, hydrobromic, thiocyanic, sulfuric, phosphoric, sulfamic, acetic, lactic, tartaric, gluconic, citric, benzoic, salicylic, and like acids. For example, the free base is dissolved in a solvent, illustratively, ether, ethanol, ethyl acetate, and the like, and acid is added. The acid addition salt thus formed is separated, and purified using conventional procedures, e.g., recrystallization, etc. Advantageously, the said acid addition salt can be reconverted to the purified free base.

The lower-alkyl quaternary ammonium salts are obtained by reacting a free base (Formula I above) in the presence of an inert solvent with a quaternary ammonium salt-producing compound, advantageously, a quaternary amonium salt-producing compound having a pharmacologically acceptable anion, for example, chloride, iodide, bromide, p-toluene-sulfonate, sulfate, and like anions. The term "lower-alkyl" includes methyl, ethyl, propyl, butyl, amyl, hexyl, heptyl, octyl, and the isomeric forms thereof. Suitable inert solvents for this reaction include for example, acetone, methyl ethyl ketone, ethanol, benzene, ether, and the like. The reaction can be carried out at temperatures ranging from about −10° C. to 40° C., preferably, from about 0° C. to 25° C. The lower alkyl quaternary ammonium salt thus formed is separated, and purified if so desired, using conventional methods, e.g., recrystallization, etc.

When used in therapy the novel lower-alkyl quaternary ammonium salts of the invention can be combined with solid or liquid pharmaceutical carriers and formulated in the form of tablets, powder packets, or capsules, using starch and like excipients, or dissolved or suspended in suitable solvents or vehicles, for oral or parenteral administration.

The following examples are illustrative of the process

PREPARATION 1

Preparation of 1-phenethyl-4-piperidinol

A solution consisting of 101.2 g. (1 mole) of 4-piperidinol and 127.0 g. (1.2 moles) of sodium carbonate dissolved in 600 ml. of water was heated to 60° C. in a 2-liter flask equipped with a thermometer, stirrer, dropping funnel, and condenser. During an interval of 3.5 hours, while maintaining the temperature of the reaction mixture between 50° and 60° C., a solution of 185.1 g. (1 mole) of penethyl bromide in 500 ml. of ethanol was added. The reaction mixture was refluxed for 4 hours with stirring, and allowed to stand overnight at about 25° C. The mixture was then distilled (using a simple distilling head) until the head temperature reached 95° C., and then cooled to about 25° C. The mixture thus stripped of ethanol was then extracted with five 200-ml. portions of methylene chloride, and the combined methylene chloride extracts were washed with two 100-ml. portions of saturated sodium chloride solution. The washed methylene chloride solution was then dried overnight with 50 g. of anhydrous sodium sulfate. The solution was filtered, and concentrated to dryness under reduced pressure. The last traces of solvent were removed by heating the residue at about 95° C. at about 40 mm. mercury pressure for 20 minutes. The warm oily residue thus obtained was triturated with two 250-ml. portions of technical hexane (Skellysolve B). The product thus obtained was dissolved in 100 ml. of absolute ethanol and the solution was warmed to 35° C.; 200 ml. of U.S.P. ether was then added while swirling the solution gently. The ether-ethanol solution was cooled slowly and refrigerated at about −15° C. for 3 days, in order to induce substantially complete crystallization. The crystals were recovered on a filter, the filter cake was washed with 50 ml. of cold ether, and the crystals of 1-phenethyl-4-piperidinol were dried to constant weight in an oven at 50° C. under reduced pressure; dry weight, 124.2 g., melting point, 95.5° to 98.5° C.

Following the procedure described above but substituting for phenethyl bromide the following: p-chlorophenethyl bromide, p-ethylphenethyl bromide, and p-methoxyphenethyl bromide; 1-(p-chlorophenethyl)-4-piperidinol, 1-(p-ethylphenethyl)-4-piperidinol, and 1-(p-methoxyphenethyl)-4-piperidinol, respectively, were prepared.

EXAMPLE 1

Preparation of 1-phenethyl-4-piperidyl acetylsalicylate and hydrochloride and methobromide thereof

*Part A—Preparation of 1-phenethyl-4-piperidyl acetylsalicylate.*—A mixture consisting of 20.53 g. (0.10 mole) of 1-phenethyl-4-piperidinol in 100 ml. of triethylamine was cooled to 0° C., and a solution consisting of 23.8 g. (0.12 mole) of acetylsalicyloyl chloride and 25 ml. of methylene chloride was added dropwise during an interval of 3 hours. The reaction mixture was stirred overnight at about 25° C., and was then neutralized with a solution of 21 g. (0.25 mole) of sodium bicarbonate in 100 ml. of water. After thorough mixing, the neutralized reaction mixture was extracted with 300 ml. and two 50-ml. portions of methylene chloride. The methylene chloride extracts were combined, washed with two 50-ml. portions of water, dried with 25 g. of anhydrous sodium sulfate, and the solvent was evaporated under reduced pressure. The residue thus obtained was taken up in 100 ml. of toluene and the toluene solution was evaporated under reduced pressure, the last traces of solvent being removed by heating at 100° C. for a few minutes under high vacuum in a rotary evaporator. 1-phenethyl-4-piperidyl acetylsalicylate was recovered as a yellow syrup.

*Part B—Preparation of 1-phenethyl-4-piperidyl acetylsalicylate hydrochloride.*—The yellow syrup obtained in Part A was dissolved in 90 ml. of absolute ethanol and 9 ml. of concentrated hydrochloric acid was added, dropwise, keeping the reaction mixture below 5° C. The resulting solution was refrigerated overnight at 0° C. The white crystals that formed were recovered on a filter, slurried with ether, and dried, yielding 30.95 g. (76.5%) of crude 1-phenethyl-4-piperidyl acetylsalicylate hydrochloride which was then recrystallized from 300 ml. of absolute ethanol. The crystals thus obtained were slurried with ether, recovered by filtration, and dried overnight at 50° C. in a vacuum oven, yielding 28.4 g. (70.2%) of 1-phenethyl-4-piperidyl acetylsalicylate hydrochloride having a melting point of 209° to 211° C.

*Analysis.*—Calculated for $C_{22}H_{26}ClNO_4$: C, 65.41; H, 6.49; N, 3.47; Cl 8.78. Found: C, 65.26; H, 6.66; N, 3.72; Cl, 9.05.

*Part C—Preparation of 1-phenethyl-4-piperidyl acetylsalicylate methobromide.*—A mixture consisting of 12.12 g. (0.03 mole) of 1-phenethyl-4-piperidyl acetylsalicylate hydrochloride (Part B) and 200 ml. of methylene chloride was shaken with 100 ml. of water containing 4.2 g. of sodium bicarbonate until all solids were dissolved and evolution of carbon dioxide ceased. The aqueous phase was separated, and extracted with two 50-ml. portions of methylene chloride. The original methylene chloride solution and the methylene chloride extracts were combined, washed with 25 ml. of water, and dried with 15 g. of anhydrous sodium sulfate. The dried solution was filtered and the methylene chloride was evaporated under reduced pressure. The 1-phenethyl-4-piperidyl acetylsalicylate obtained as a residue was dissolved in 50 ml. of benzene and the benzene solution was diluted with an equal volume of ether. The solution was cooled to 0° C. and 20 ml. of methyl bromide was added. The reaction mixture was allowed to stand for three days at 0° to 5° C. and another day at 25° C. A white solid that formed was recovered on a filter, slurried with two 50-ml. portions of ether, and air-dried, yielding 13.05 g. of product. This material was purified by dissolving it in 30 ml. of absolute ethanol, and then diluting slowly with 60 ml. of boiling ether. After holding the solution for 60 hours at 25° C., white crystals separated. The crystals were recovered on a filter, dried two hours at 50° C. under reduced pressure, and stored for 16 hours in a vacuum desiccator at 25° C., yielding 10.4 g. (75%) of 1-phenethyl-4-piperidyl acetylsalicylate methobromide. The compound, after recrystallization from ethyl acetate containing a small amount of methanol, had a melting point of 221° to 225° C.

*Analysis.*—Calculated for $C_{23}H_{28}BrNO_4$: C, 59.74; H, 6.10; Br, 17.28; N, 3.03. Found: C, 59.84; H, 6.10; Br, 17.31; N, 3.21.

EXAMPLE 2

Preparation of 1-(p-chlorophenethyl)-4-piperidyl acetylsalicylate and hydrochloride and methobromide thereof

*Part A—Preparation of 1 - (p-chlorophenethyl) - 4 - piperidyl acetylsalicylate.*—Following the procedure of Example 1, Part A, but substituting 1-(p-chlorophenethyl)-4-piperidinol for 1-phenethyl - 4 - piperidinol, 1-(p-chlorophenethyl) - 4 - piperidyl acetylsalicylate was prepared.

*Part B—Preparation of 1 - (p-chlorophenethyl) -4 - piperidyl acetylsalicylate hydrochloride.*—Following the procedure of Example 1, Part B, but substituting 1-(p-chlorophenethyl)-4-piperidyl acetylsalicylate for 1-phenethyl-4-piperidyl acetylsalicylate, 1-(p-chlorophenethyl)-4-piperidyl acetylsalicylate hydrochloride was prepared.

*Part C—Preparation of 1-(p-chlorophenethyl) - 4 - piperidyl acetylsalicylate methobromide.*—Following the procedure of Example 1, Part C, but substituting 1-(p-chlorophenethyl) - 4 - piperidyl acetylsalicylate hydrochloride for 1-phenethyl - 4 - piperidyl acetylsalicylate hydrochloride, 1-(p-chlorophenethyl)-4- piperidyl acetylsalicylate methobromide was prepared.

EXAMPLE 3

*Preparation of 1-(p-methoxyphenethyl) - 4 - piperidyl acetylsalicylate and hydrochloride and methobromide thereof*

*Part A—Preparation of 1 - (p - methoxyphenethyl)-4-piperidyl acetylsalicylate.*—Following the procedure of Example 1, Part A, but substituting 1-(p-methoxyphenethyl)-4-piperidinol for 1-phenethyl-4-piperidinol, 1-(p-methoxyphenethyl) - 4 - piperidyl acetylsalicylate was prepared.

*Part B—Preparation of 1-(p-methoxyphenethyl) - 4 - piperidyl acetylsalicylate hydrochloride.*—Following the procedure of Example 1, Part B, but substituting 1-(p-methoxyphenethyl) - 4 - piperidyl acetylsalicylate for 1-phenethyl-4-piperidyl acetylsalicylate, 1-(p-methoxyphenethyl) - 4 - piperidyl acetylsalicylate hydrochloride was prepared.

*Part C—Preparation of 1-(p-methoxyphenethyl) - 4 - piperidyl acetylsalicylate methobromide.*—Following the procedure of Example 1, Part C, but substituting 1-(p-methoxyphenethyl) - 4 - piperidyl acetylsalicylate hydrochloride for 1-phenethyl - 4 - piperidyl acetylsalicylate hydrochloride, 1-(p-methoxyphenethyl) - 4 - piperidyl acetylsalicylate methobromide was prepared.

EXAMPLE 4

*Preparation of 1 - (p-ethylphenethyl)-4-piperidyl acetylsalicylate and hydrochloride and methobromide thereof*

*Part A—Preparation of 1 - (p-ethylphenethyl) - 4 - piperidyl acetylsalicylate.*—Following the procedure of Example 1, Part A, but substituting 1-(p-ethylphenethyl)-4-piperidinol for 1-phenethyl-4-piperidinol, 1 - (p-ethylphenethyl)-4-piperidyl acetylsalicylate was prepared.

*Part B—Preparation of 1 - (p - ethylphenethyl) - 4 - piperidyl acetylsalicylate hydrochloride.*—Following the procedure of Example 1, Part B, but substituting 1-(p-ethylphenethyl)-4-piperidyl acetylsalicylate for 1-phenethyl-4-piperidyl acetylsalicylate, 1 - (p-ethylphenethyl)-4-piperidyl acetylsalicylate hydrochloride was prepared.

*Part C—Preparation of 1 - (p - ethylphenethyl) - 4 - piperidyl acetylsalicylate methobromide.*—Following the procedure of Example 1, Part C, but substituting 1-(p-ethylphenethyl) - 4 - piperidyl acetylsalicylate hydrochloride for 1 - phenethyl - 4 - piperidyl acetylsalicylate hydrochloride, 1 - (p-ethylphenethyl)-4-piperidyl acetylsalicylate methobromide was prepared.

EXAMPLE 5

*Preparation of 1-phenethyl-4-piperidyl octanoylsalicylate and hydrochloride and methobromide thereof*

*Part A—Preparation of 1-phenethyl-4-piperidyl octanoylsalicylate.*—Following the procedure of Example 1, Part A, but substituting octanoylsalicyloyl chloride for acetylsalicyloyl chloride, 1-phenethyl-4-piperidyl octanoylsalicylate was prepared.

*Part B—Preparation of 1-phenethyl-4-piperidyl octanoylsalicylate hydrochloride.*—Following the procedure of Example 1, Part B, but substituting 1-phenethyl-4-piperidyl octanoylsalicylate for 1-phenethyl-4-piperidyl acetylsalicylate, 1-phenethyl-4-piperidyl octanloylsalicylate hydrochloride was prepared.

*Part C—Preparation of 1-phenethyl-4-piperidyl octanoylsalicylate methobromide.*—Following the procedure of Example 1, Part C, but substituting 1-phenethyl-4-piperidyl octanoylsalicylate hydrochloride for 1-phenethyl-4-piperidyl acetylsalicylate hydrochloride, 1-phenethyl-4-piperidyl octanoylsalicylate methobromide was prepared.

EXAMPLE 6

*Preparation of 1-phenethyl-4-piperidyl isobutyrylsalicylate and hydrochloride and methobromide thereof*

*Part A—Preparation of 1-phenethyl-4-piperidyl isobutyrylsalicylate.*—Following the procedure of Example 1, Part A, but substituting isobutyrylsalicyloyl chloride for acetylsalicyloyl chloride, 1-phenethyl-4-piperidyl isobutyrylsalicylate was prepared.

*Part B—Preparation of 1-phenethyl-4-piperidyl isobutyrylsalicylate hydrochloride.*—Following the procedure of Example 1, Part B, but substituting 1-phenethyl-4-piperidyl isobutyrylsalicylate for 1-phenethyl-4-pipidyl acetylsalicylate, 1-phenethyl-4-piperidyl isobutyrylsalicylate hydrochloride was prepared.

*Part C—Preparation of 1-phenethyl-4-piperidyl isobutyrylsalicylate methobromide.*—Following the procedure of Example 1, Part C, but substituting 1-phenethyl-4-piperidyl isobutyrylsalicylate hydrochloride for 1-phenethyl-4-piperidyl acetylsalicylate hydrochloride, 1-phenethyl-4-piperidyl isobutyrylsalicylate methobromide was prepared.

EXAMPLE 7

Following the procedure of Example 1, Part C, but substituting methyl chloride, methyl iodide, ethyl bromide, methyl p-toluenesulfonate, butyl iodide, 2-ethylhexyl bromide, ethyl sulfate, and ethyl iodide for methyl bromide the corresponding 1-phenethyl-4-piperidyl acetylsalicylate methochloride, 1-phenethyl-4-piperidyl acetylsalicylate methoiodide, 1-phenethyl-4-piperidyl acetylsalicylate ethobromide, 1-phenethyl-4-piperidyl acetylsalicylate metho-p-toluenesulfonate, 1-phenethyl-4-piperidyl acetylsalicylate butoiodide, 1-phenethyl-4-piperidyl acetylsalicylate 2-ethylhexobromide, 1-phenethyl-4-piperidyl acetylsalicylate ethosulfate, and 1-phenethyl-4-piperidyl acetylsalicylate ethoiodide were prepared.

Following the same procedure but substituting methyl chloride, methyl iodide, ethyl bromide, methyl p-toluenesulfonate, butyl iodide, 2-ethylhexyl bromide, ethyl sulfate, and ethyl iodide for methyl bromide in Example 2, Part C; Example 3, Part C; Example 4, Part C; Example 5, Part C; and Example 6, Part C; the corresponding 1-(p-chlorophenethyl)-4-piperidyl acetylsalicylate methochloride, 1-(p-chlorophenethyl)-4-piperidyl acetylsalicylate methoiodide, 1-(p-chlorophenethyl)-4-piperidyl acetylsalicylate ethobromide, 1-(p-chlorophenethyl)-4-piperidyl acetylsalicylate metho-p-toluenesulfonate, 1-(p-chlorophenethyl)-4-piperidyl acetylsalicylate butoiodide, 1-(p-chlorophenethyl)-4-piperidyl acetylsalicylate 2-ethylhexobromide, 1-(p-chlorophenethyl)-4-piperidyl acetylsalicylate ethosulfate, 1-(p-chlorophenethyl)-4-piperidyl acetylsalicylate ethoiodide, 1-(p-methoxyphenethyl)-4-piperidyl acetylsalicylate methochloride, 1-(p-methoxyphenethyl)-4-piperidyl acetylsalicylate methoiodide, 1-(p-methoxyphenethyl)-4-piperidyl acetylsalicylate ethobromide, 1-(p-methoxyphenethyl)-4-piperidyl acetylsalicylate metho-p-toluenesulfonate, 1-(p-methoxyphenethyl)-4-piperidyl acetylsalicylate butoiodide, 1-(p-methoxyphenethyl)-4-piperidyl acetylsalicylate 2-ethylhexobromide, 1-(p-methoxyphenethyl)-4-piperidyl acetylsalicylate ethosulfate, 1-(p-methoxyphenethyl)-4-piperidyl acetylsalicylate ethoiodide, 1-(p-ethylphenethyl)-4-piperidyl acetylsalicylate methochloride, 1-(p-ethylphenethyl)-4-piperidyl acetylsalicylate methoiodide, 1-(p-ethylphenethyl)-4-piperidyl acetylsalicylate ethobromide, 1-(p-ethylphenethyl)-4-piperidyl acetylsalicylate metho-p-toluenesulfonate, 1-(p-ethylphenethyl)-4-piperidyl acetylsalicylate butoiodide, 1-(p-ethylphenethyl)-4-piperidyl acetylsalicylate 2-ethylhexobromide, 1-(p-ethylphenethyl)-4-piperidyl acetylsalicylate ethosulfate, 1-(p-ethylphenethyl)-4-piperidyl acetylsalicylate ethoiodide, 1-phenethyl-4-piperidyl octanoylsalicylate methochloride, 1-phenethyl-4-piperidyl octanoylsalicylate methoiodide, 1-phenethyl-4-piperidyl octanoylsalicylate ethobromide, 1-phenethyl-4-piperidyl octanoylsalicylate metho-p-toluenesulfonate, 1-phenethyl-4-piperidyl octanoylsalicylate butoiodide, 1-phenethyl-4-piperidyl octanoylsalicylate 2-ethylhexobromide, 1-phenethyl-4-piperidyl octanoylsalicylate ethosulfate, 1-phenethyl-4-piperidyl octanoylsalicylate ethoiodide, 1-phenethyl-4-piperidyl isobutyrylsalicylate methochloride, 1-phenethyl-4-piperidyl isobutyrylsalicylate methoiodide, 1-phenethyl-4-piperidyl isobutyrylsalicylate ethobromide, 1-phenethyl-4-piperidyl isobutyrylsalicylate metho-p-toluenesulfonate, 1-phenethyl-4-piperidyl isobutyrylsalicylate butoiodide, 1-phenethyl-4-piperidyl isobutyrylsalicylate, 2-ethylhexobromide, 1-phenethyl-4-piperidyl isobutyrylsalicylate ethosulfate, and 1-phenethyl-4-piperidyl isobutyrylsalicylate ethoiodide were prepared.

EXAMPLE 8

Ten thousand (10,000) scored tablets for oral use, each containing 10 mg. of 1-phenethyl-4-piperidyl acetylsalicylate methobromide, are prepared from the following types and amounts of ingredients:

| | G. |
|---|---|
| 1-phenethyl-4-piperidyl acetylsalicylate methobromide | 100 |
| Starch, U.S.P. | 170 |
| Talc, U.S.P. | 130 |
| Lactose, U.S.P. | 2600 |
| Sucrose powder, U.S.P. | 37 |
| Calcium stearate | 19.5 |

The finely powdered loctose and sucrose are mixed well and the mixture is granulated with 10% starch paste. The wet mass is forced through an 8-mesh screen, and dried at 120° F. in a forced-air oven, and then put through a 16-mesh screen. The remainder of the ingredients, in fine powder form, are mixed well and then mixed with the dried lactose granules. The final mixture is then compressed into tablets, which are administered at the rate of ½ to 2 tablets 1 to 4 times a day for pressor effect.

I claim:

1. A compound selected from the group consisting of a compound of the following structural formula:

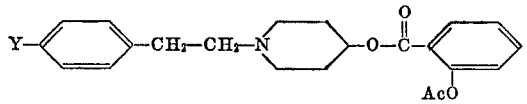

wherein Y is selected from the group consisting of hydrogen, halogen having an atomic weight between 35 and 127, lower-alkyl, and lower-alkoxy; and wherein Ac is alkanoyl of 1 to 8 carbon atoms, inclusive; and acid addition and lower-alkyl quaternary ammonium salts thereof.

2. 1-phenethyl-4-piperidyl alkanoylsalicylate according to claim 1.

3. 1-phenethyl-4-piperidyl acetylsalicylate.

4. 1-phenethyl-4-piperidyl alkanoylsalicylate acid addition salt according to claim 1.

5. 1-phenethyl-4-piperidyl acetylsalicylate hydrochloride.

6. 1-phenethyl-4-piperidyl alkanoylsalicylate lower-alkyl quaternary ammonium salt according to claim 1.

7. 1-phenethyl-4-piperidyl acetylsalicylate methobromide.

References Cited in the file of this patent

UNITED STATES PATENTS

| 2,474,796 | Van Campen et al. | June 28, 1949 |
| 2,606,205 | Shelton et al. | Aug. 5, 1952 |
| 2,816,895 | Ehrhart et al. | Dec. 17, 1957 |
| 2,918,407 | Biel | Dec. 22, 1959 |

FOREIGN PATENTS

| 448,181 | Great Britain | May 25, 1936 |
| 483,258 | Great Britain | Apr. 14, 1938 |

OTHER REFERENCES

Biel et al.: J. Am. Chem. Soc., vol. 77, pages 2250–6 (1955).

Jerzmanowska et al.: Chemical Abstracts, vol. 50, page 16, 671D (1956).

Szadowska et al.: Chemical Abstracts, vol. 51, page 13203b (1957).